Figure 1A:
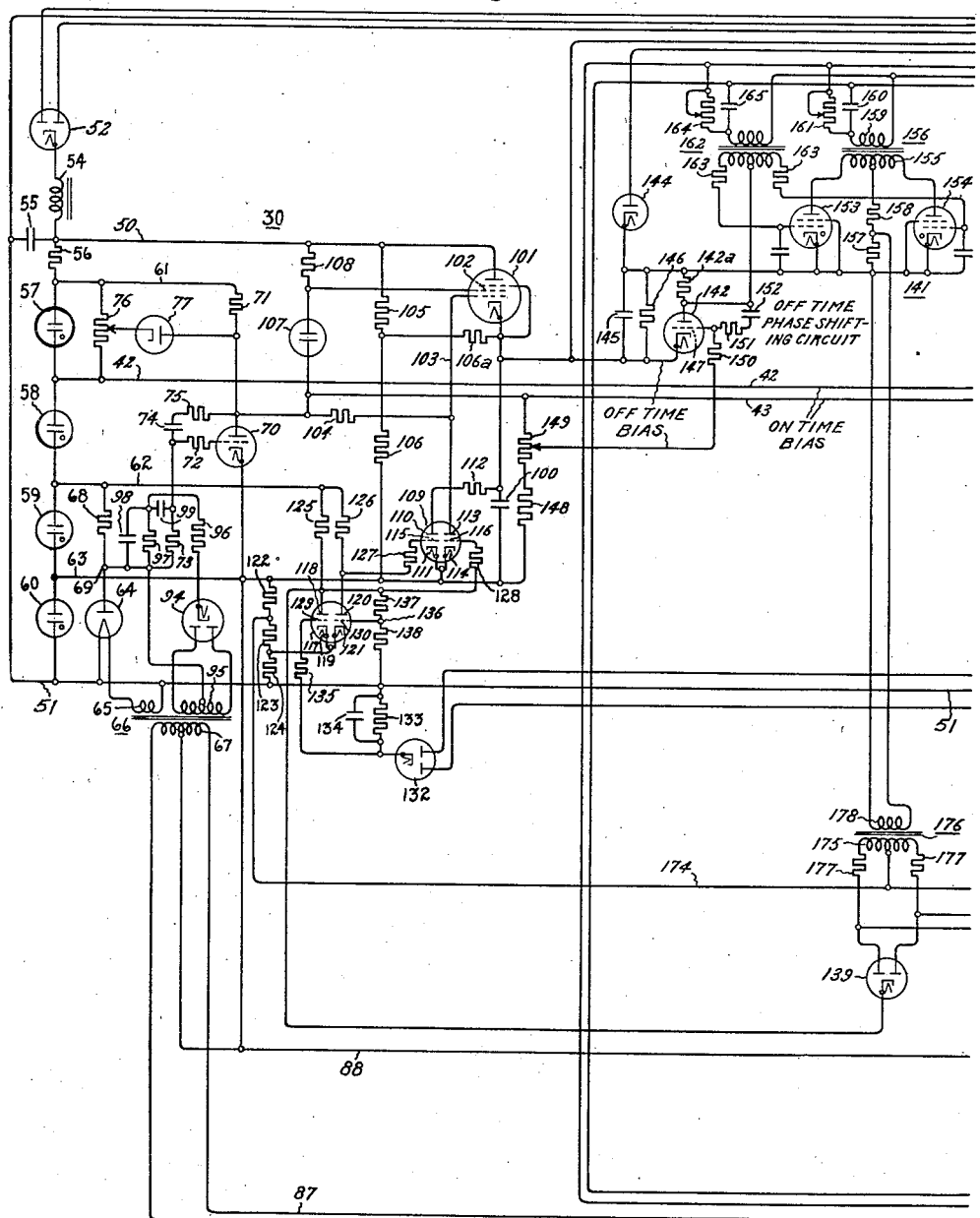

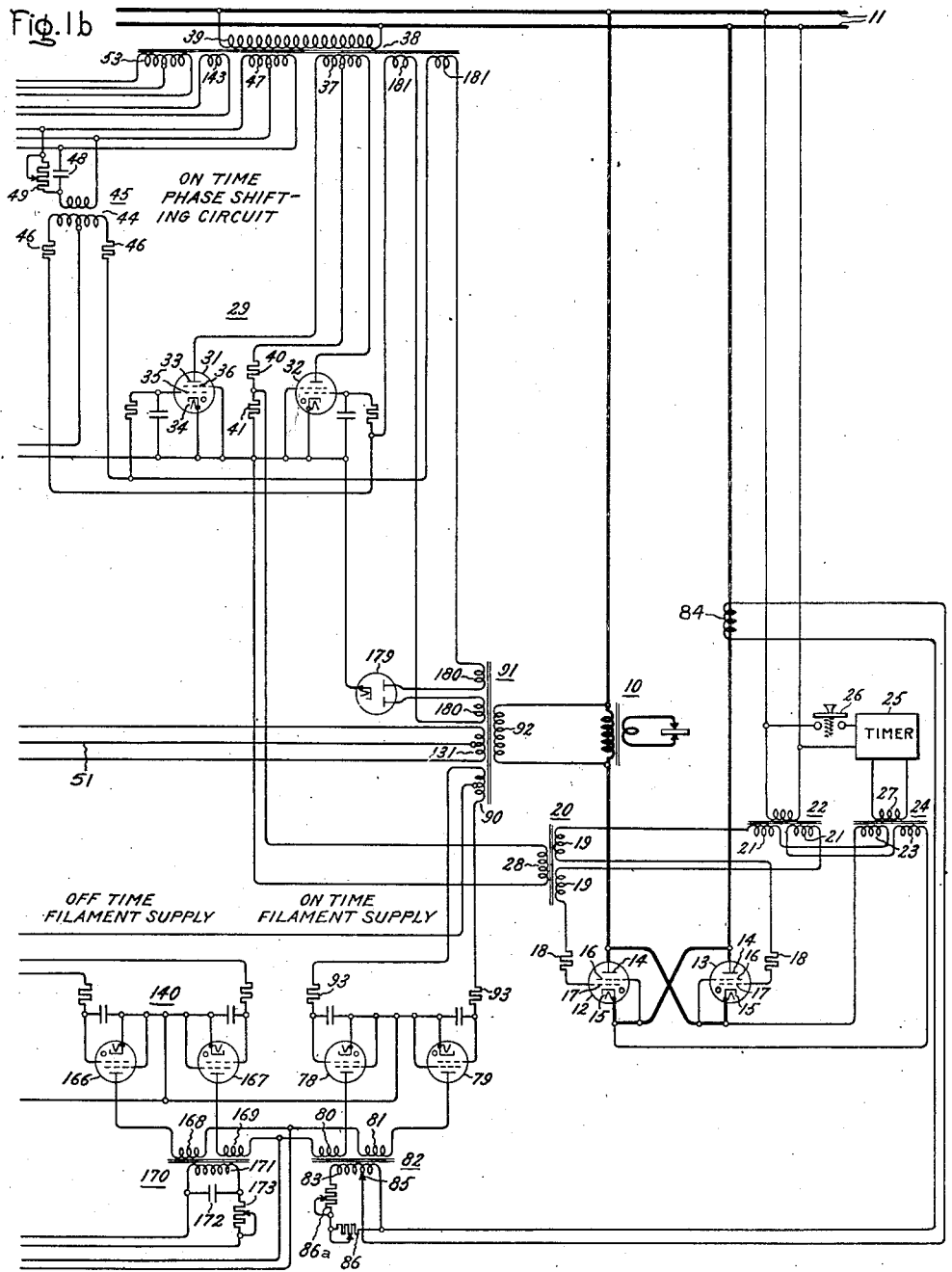

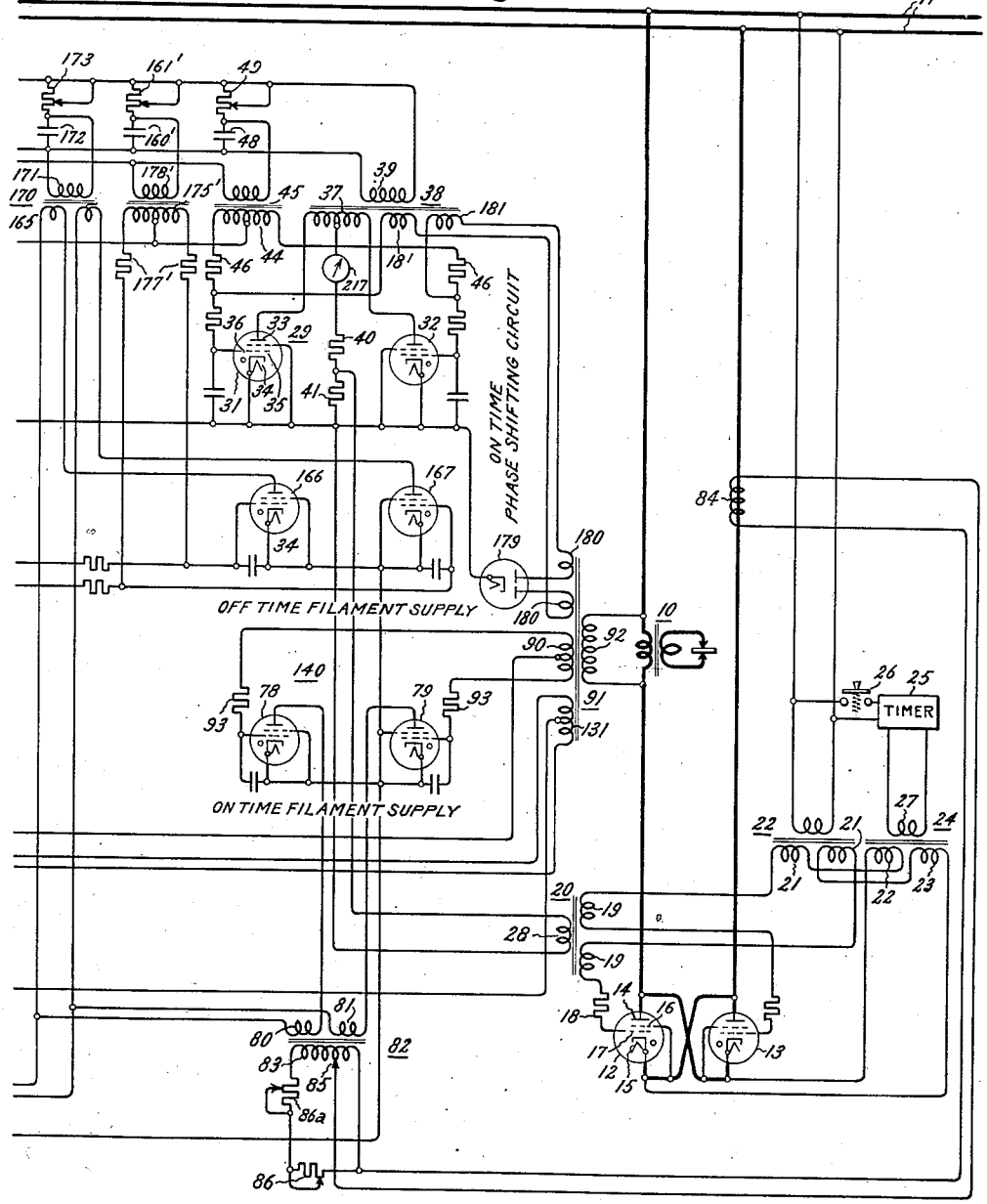

Patented Apr. 10, 1945

2,373,545

UNITED STATES PATENT OFFICE 2,373,545

ELECTRIC CONTROL CIRCUIT

Benjamin Cooper and Orrin W. Livingston, Scotia, N. Y., assignors to General Electric Company, a corporation of New York Application November 1, 1943, Serial No. 508,610

16 Claims. (Cl. 171—119)

Our invention relates to electric control circuits and particularly to improved regulating circuits especially adapted for regulating the current supplied to an intermittently energized load circuit.

In the application of electric valves to resistance welding circuits, some difficulty has been experienced in regulating the current supplied to the welding transformer, particularly with respect to controlling the magnitude of the current during the first cycle or cycles of each period of energization. Our invention relates to an improved regulating circuit particularly adapted for reguating the current supplied to intermittently energized loads and which insures a substantially uniform supply of current to the load circuit during each cycle of the periods of energization. Our invention is in the nature of an improvement over the systems described and claimed in Livingston Patent No. 2,355,453, dated August 3, 1944, and Cooper application Serial No. 480,150, filed March 23, 1943. The Livingston patent and Cooper application are assigned to the assignee of the present invention and are to be considered prior art with respect to the invention of this application.

It is an object of our invention to provide a new and improved electric control circuit.

It is another object of our invention to provide a new and improved regulating circuit for controlling the magnitude of the current supplied to an intermittently energized load circuit.

It is still another object of our invention to provide a new and improved control circuit for regulating the magnitude of the alternating current supplied to an intermittently energized load which insures uniform energization of the load circuit throughout each interval.

In accordance with one illustrated embodiment of our invention we employ a pair of reversely connected electric valve means for supplying energy from an alternating current supply circuit to a resistance welding transformer. The electric valves are rendered conductive intermittently under the control of a timer and the instant of initiation of conduction during each cycle of each period of energization is controlled by an improved regulating circuit. During each period of energization, the regulation is accomplished directly in response to the welding current. During this same interval a capacitor is charged to a voltage dependent upon the phase position of the excitation voltage of the electric valves. During a period of deenergization following a period of energization, the regulating circuit is variably energized in accordance with the supply circuit voltage by means including a phase shift circuit controlled by variations in the output of the regulator circuit with respect the voltage of the capacitor which was charged during the immediately preceding period of energization. In this way, the circuit may be considered to operate as an "on-time" current regulator and an "off-time" voltage compensator with the compensation for source voltage changes being accomplished with reference to the voltage existing at the end of the preceding period of energization.

Our invention will be better understood by reference to the following description taken in connection with the accompanying drawings, and its scope will be pointed out in the appended claims. In the drawings, Figs. 1a and 1b considered together are a schematic representation of one embodiment of our invention, and Figs. 2a and 2b are a schematic representation of another embodiment of our invention.

Figure 2A:
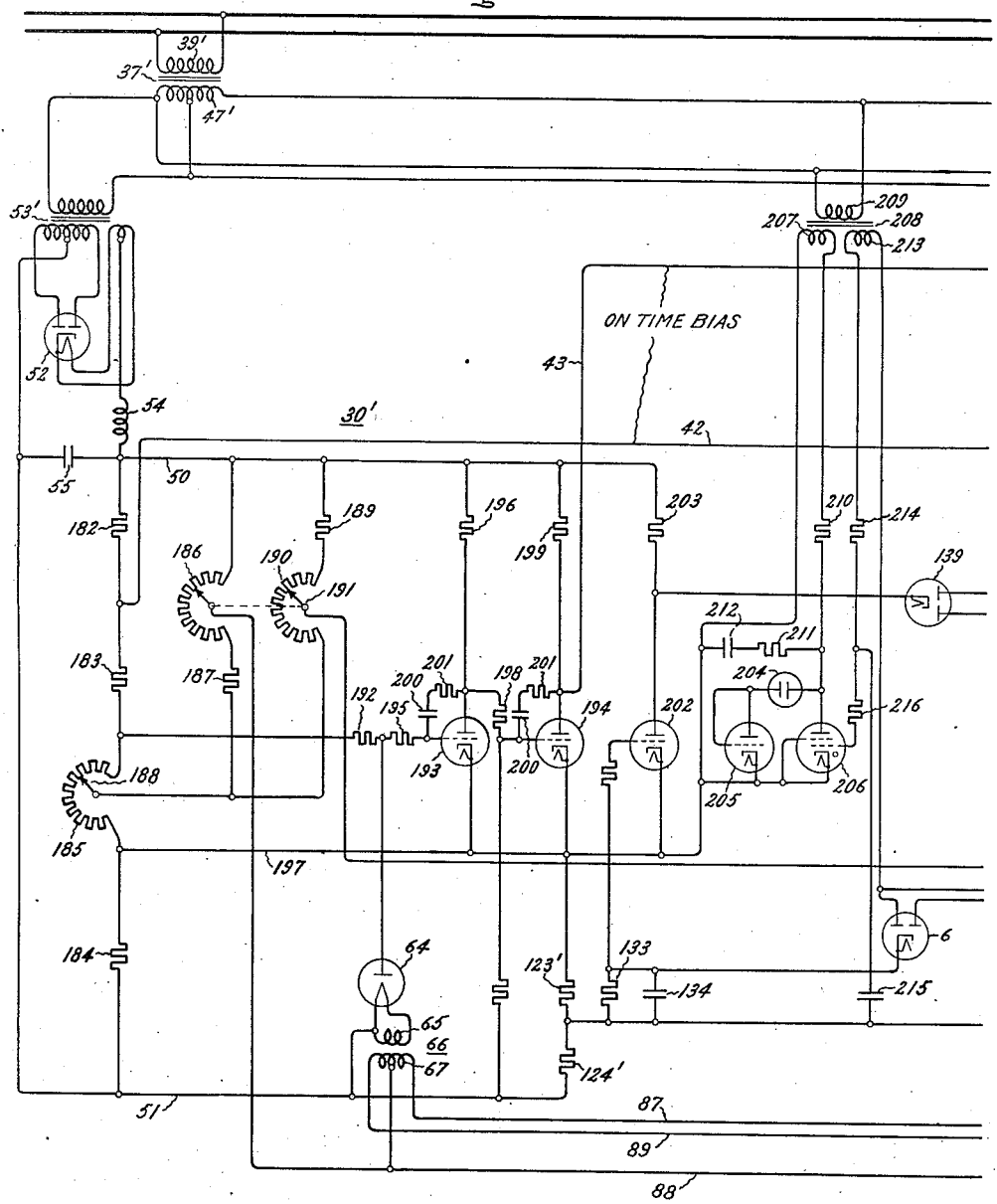

Referring now to Figs. 1a and 1b of the drawings, we have shown our invention embodied in a regulating circuit for controlling the magnitude of the current supplied to a welding transformer 10 from an alternating current supply circuit 11 through a pair of reversely connected electric valve means 12 and 13. The electric valve means may be of the type employing an immersion-ignitor control member and a liquid cathode or, as illustrated, may comprise an anode 14, a cathode 15, a control grid 16 and a shield grid 17. The electrodes are enclosed in an envelope containing an ionizable medium, such as a gas or a vapor. The excitation circuits for electric valves 12 and 13 are identical so only one will be described, and the same reference numerals will be applied to corresponding parts. Referring to the electric valve 12, the control member 17 thereof is connected to the cathode through an excitation circuit including a current limiting resistor 18, a secondary winding 19 of a transformer 20, a secondary winding 21 of a transformer 22 and a secondary winding 23 of a transformer 24. The secondary winding 21 impresses an alternating current voltage on control member 16 which is in phase opposition to the anode voltage thereof to render the electric valve nonconductive. The cycles during which the electric valve may be rendered conductive are determined by a timer control illustrated generally by the numeral 25 which is energized from the alternating current supply circuit 11 under the control of an initiating switch 26, and which impresses an alternating current voltage on the primary winding 27 of the transformer 24 during those periods that the load is to be energized. The voltage of the secondary winding 23 is in phase with the anode voltage of the electric valve 12 but is insufficient in magnitude to overcome the hold-off voltage impressed on the control member by the winding 21. The primary winding 28 of the transformer 20 is energized by the output of a phase shifting circuit illustrated generally by the numeral 29 which determines the phase of the peaked voltage induced in the secondary winding 19 of the transformer 20 to determine the instant in the anode-cathode voltage wave of the valve 12 at which conduction is initiated. In other words, the timer control 25 and transformer 24 determine the cycles during which the welding transformer is energized through the electric valves 12 and 13, and the peaked voltages of the secondary windings of the transformer 20 determine the time in the cycle that conduction is initiated to determine the magnitude of the current supplied to the welding transformer during the periods of energization.

The phase relation of the peaked voltages produced in the secondary windings 19 of transformer 20 and as a result the magnitude of the current supplied to the welding transformer is determined by the phase shifting circuit 29 which is controlled by the output of a regulating circuit illustrated generally by the numeral 30. The phase shifting circuit includes a pair of electric valve means 31 and 32 which are connected to energize the primary winding 28 of transformer 20 with voltage impulses at instants determined by the operation of the regulating circuit 30. The electric valves 31 and 32 are, as illustrated, preferably of the type employing an ionizable medium, such as a gas or a vapor, and each comprises an anode 33, a cathode 34, a control grid 35 and a shield grid 36. The cathodes of electric valves 31 and 32 are connected together and the anodes thereof are connected, respectively, with the end terminals of a mid-tapped secondary winding 37 of a transformer 38 having a primary winding 39 thereof energized from the alternating current supply circuit 11. The mid-terminal of the transformer winding 33 is connected to the cathodes of electric valves 31 and 32 through resistors 40 and 41 connected in series. The primary winding 28 of the peaking transformer 20 is connected across the terminals of resistor 41 and resistance 40 serves as a means of adjusting the magnitude of the voltage peaks produced by transformer secondary windings 19 when the electric valves 31 and 32 are rendered conductive. Thus, the phase shifting circuit 29 provides a means for shock exciting the primary winding of the peaking transformer 20 to produce voltages of peaked wave form at instants in the supply circuit voltage wave determined by the instants that the electric valves 31 and 32 are rendered conductive. Referring to the drawings, the initiation of conduction in the valves 31 and 32 is controlled by an excitation circuit including the output conductors 42 and 43 of the regulating circuit 30 and the secondary winding 44 of a transformer 45 which provides an alternating current component of grid voltage which lags the anode voltage of electric valves 31 and 32 by approximately 90 electrical degrees. Conductor 43 is connected with the cathodes of electric valves 31 and 32, and the conductor 42 is connected to the mid-point of the transformer secondary winding 44. The end terminals of the winding 44 are connected respectively with the control members 35 of valves 31 and 32 through resistors 46. The primary winding of the transformer 45 is energized by a voltage derived from the alternating current supply circuit 11 through a secondary winding 47 of the transformer 38 and a phase shifting means including a capacitor 48 and an adjustable resistor 49. The capacitor 48 and resistor 49 are connected in series across the end terminals of transformer winding 47, and the primary winding of transformer 45 is connected between the common terminal of the resistor and capacitor and the midtap of transformer winding 47.

During the periods that the load circuit is energized, the regulating circuit 30 functions to produce a variable unidirectional voltage across the conductors 42 and 43 in response to variations in the current supplied to the load circuit. The portion of the circuit which functions during the "on" time will now be described. A supply of unidirectional voltage for the regulating circuit 30 is impressed on the conductors 50 and 51 from the output of a full wave rectifier which comprises a gaseous discharge device 52 and a mid-tapped secondary winding 53 of the transformer 38. The output of the rectifier is filtered by a series reactor 54 and a parallel capacitor 55. A resistor 56 and voltage regulating discharge devices 57, 58, 59 and 60, preferably of the cold cathode type, are connected in series between the conductors 50 and 51 to establish different levels of direct current voltage for the regulating circuit. These voltages appear on conductors 61, 42, 62 and 63. In order to render the regulating circuit 30 responsive to the heating value of the current supplied to the load circuit, we employ a regulating electric valve illustrated as an electric discharge device 64 having a filamentary-type cathode which is variably energized in accordance with the magnitude of the load current. The filament is energized by the voltage of the secondary winding 65 of a transformer 66 having a primary winding 67 thereof energized in response to load current by a circuit which will be described more in detail at a later point in the specification. The anode-cathode circuit of the discharge device 64 is connected in series with a resistor 68 and across the conductors 51 and 62 to provide a bridge circuit, the output terminals of which comprise the conductor 63 and the common terminal 69 of resistor 68 and discharge device 64. The voltage appearing between the terminal 69 and conductor 63 is impressed on the control member of an amplifying valve 70. The cathode of the electric valve 70 is connected with the conductor 63, and the anode is connected with the conductor 61 through a load resistor 71. The control member of the valve 70 is connected through a current limiting resistor 72 and a second resistor 73 to the output terminal 69 of the bridge circuit. The control member of the valve 70 is connected with the anode thereof through a series capacitor 74 and resistance 75 which serve to suppress transient voltages on the control member. The output conductors 42 and 43 of the regulating circuit 30 are connected, respectively, with the common terminal of discharge devices 57 and 58 and the anode of amplifying valve 70 so that the direct current voltage appearing between conductors 42 and 43 varies in accordance with the conductivity of the electric valve 70 and, therefore, in accordance with the energization of the filament of valve 64.

In order to establish a minimum voltage across conductors 42 and 43 and in this way establish the minimum heat setting at which the regulator may operate, we provide a circuit including voltage dividing resistor 76 connected across the terminals of discharge device 57 and a discharge device 77 having the anode connected to the anode of the regulating valve 70 and the cathode connected with an adjustable point on the voltage dividing resistor 76. As the conductivity of the regulating valve 70 is decreased, the anode of the electric discharge device 77 becomes more positive and at a predetermined point, dependent upon the position of the adjustable tap on the voltage dividing resistor 76, will be rendered conductive to connect the conductor 43 directly with the voltage dividing resistor 76.

The circuit for energizing the filamentary cathode of the regulating electric valve 64 during the periods of energization of the load circuit will now be described. The primary winding 67 of the transformer 66, the secondary winding 65 of which energizes the filamentary cathode of the regulating valve 64, is connected to be energized in accordance with the current conducted by a pair of electric valves 78 and 79 of a circuit designated "on-time filament supply." The anode-cathode circuits of electric valves 78 and 79 are energized by means of transformer secondary windings 80 and 81 with a voltage having a magnitude dependent upon the magnitude of the current supplied to the welding transformer. The windings 80 and 81 are the secondary windings of a transformer 82 having the primary winding 83 thereof energized from a current transformer 84 associated with one of the supply lines to the welding transformer. The magnitude of the voltage induced in windings 80 and 81 for a given current in the welding transformer is controlled by an adjustable tap 85 on the primary winding 83 and by adjustable loading resistors 86 and 86a which are connected across the transformer primary winding 83. Thus, one of the resistors, such as 86, may be calibrated directly in per cent of welding heat and resistor 86a and tap 85 may be adjusted so that the resistor 86 covers the desired range. One terminal of the secondary winding 80 is connected with the anode of electric valve 78, and the other terminal is connected through a conductor 87 to an end terminal of the transformer winding 87. The mid-terminal of this winding is connected with the cathodes of electric valves 78 and 79 through a conductor 88. In a similar manner, the secondary winding 81 has one terminal connected to the anode of electric valve 79 and the other terminal connected through a conductor 89, the other half of the transformer winding 87, and the conductor 88 to the cathodes of electric valves 78 and 79. Thus the anode voltage of electric valves 78 and 79, and as a result the voltage impressed on the primary winding of transformer 66, varies directly in accordance with the magnitude of the load current. Electric valves 78 and 79 are rendered conductive for the full period of energization of the welding transformer by means of a midtapped secondary winding 90 of a transformer 91 having a primary winding 92 connected directly across the primary winding of the welding transformer. The end terminals of the winding 90 are connected to the control members of electric valves 78 and 79 through current limiting resistors 93 to impress on the control members an alternating current voltage which is in phase with the anode voltage impressed on these valves by the transformer windings 80 and 81.

With this arrangement for energizing the filamentary cathode of the regulating electric valve 64 there is an appreciable ripple voltage in the unidirectional voltage appearing between conductor 63 and terminal 69 forming the output of the regulating bridge. For this reason, we provide means for eliminating this ripple so that a pure direct current regulating voltage may be impressed on the amplifying valve 70. We accomplish the elimination of this ripple by impressing across resistor 73 a voltage of the same character as the ripple voltage in the output circuit of the regulating bridge but of opposite phase relation. The ripple voltage across resistor 73 is derived from the output of a full wave rectifying circuit comprising an electric valve 94 having a pair of conducting paths associated with the end terminals of a midtapped transformer winding 95 of the transformer 66. Since the transformer winding 95 is energized in the same manner as the secondary winding 65 which energizes the filamentary cathode of the valve 64, it is possible to produce a ripple voltage in the output circuit of the valve 94 which will cancel the ripple voltage produced by regulating valve 64. The cathode of the valve 94 is connected through a resistor 96 to an output circuit including a parallel resistor 97 and a capacitor 98. The voltage appearing across resistor 97 is impressed on resistor 73 through a coupling capacitor 99 which isolates the two circuits, so far as direct current voltage is concerned, and passes only the ripple voltage which it is desired to impress across the terminals of resistance 73.

The circuit thus far described constitutes the current regulating system which functions during the periods of energization of the load circuit. In order to have the regulator conditioned for regulating action during the first cycle of each period of energization, it is necessary to provide some means for energizing the filamentary cathode of the regulating valve 64 during the "off" periods. In accordance with our invention, we provide means for establishing a voltage during the "on" period which is used as a reference voltage for regulating action during the "off" period.

Referring now to the drawings, we provide a capacitor 100 which is connected in series with the anode-cathode circuit of an electric valve 101 and across the direct current voltage supplied between the conductors 50 and 63. The electric valve 101 is preferably of the high vacuum pentode type in order to render the charging rate of capacitor 100 substantially independent of fluctuations in the anode-cathode voltage of the valve. The control grid 102 of the valve 101 is energized in accordance with the output voltage of the amplifying valve 70 of the regulating circuit by conductor 103 which is connected with the output conductor 43 through a suitable resistor 104. The cathode of the valve 101 is connected to the common terminal of voltage dividing resistors 105 and 106 through a resistor 106a. The voltage dividing resistors 105 and 106 are connected across the direct current supply terminals 50 and 63. In order to establish a voltage for the screen grid of the pentode 101 which is substantially constant with respect to the cathode voltage, we provide a voltage regulating discharge device 107 which is connected in series with a resistor 108 and across the conductors 50 and 43. The screen grid is connected with the common terminal of the regulating valve 107 and the resistor 106. Thus the capacitor 100 is charged during the "on" time to a voltage dependent upon the output of the regulating circuit 30, which is a measure of the phase position of the excitation voltages supplied to the control members of the main electric valves 12 and 13 and is also an indication of the magnitude of the supply circuit voltage at the end of the "on" period. In order to permit the discharge of capacitor 100 during the "on" time in the event that the conductivity of electric valve 101 is decreased, a discharge circuit across the terminals of capacitor 100 is provided by means of an electric valve means 109, preferably of the high vacuum type, having an anode 110 and a cathode 111 connected in series with resistor 112 and across the terminals of the capacitor 100. The electric valve means 109 is provided with a second discharge path including an anode 113 and a cathode 114 which connects the control grid 102 of electric valve 101 with the direct current supply conductor 63. Thus when the discharge path including anode 113 and cathode 114 is conductive, the control member of electric valve 101 is maintained at a negative voltage and the valve 101 is rendered nonconducting. The conductivities of the discharge paths of electric valve means 109 are controlled by control grids 115 and 116 which are energized in accordance with the conductivity of a switching electric valve means 117 which is similar in construction to the electric valve means 109 and is controlled in accordance with the periods of energization of the load circuit. The electric valve means 117 is provided with a pair of discharge paths, one of which includes the anode 118 and the cathode 119 and the other of which includes anode 120 and cathode 121. The cathodes are connected together and to a point of voltage intermediate the voltage of conductors 63 and 51 established by a voltage divider including resistors 122, 123 and 124. The anode 118 is connected to conductor 62 through a resistor 125, and the anode 120 is connected with the conductor 62 through a resistor 126. The control grid 115 of electric valve means 109 is connected with the anode 120 through a current limiting resistor 127, and the control grid 116 is connected with the anode 118 through a current limiting resistor 128. From an inspection of the drawings and a consideration of the relative potentials of direct current conductors 51, 62 and 63, it will be apparent that the left-hand discharge path of electric valve 109 will be conducting when the right-hand half of electric valve means 117 is nonconducting, and in a similar way the right-hand discharge path of electric valve means 109 will be conducting when the left-hand half of electric valve means 117 is nonconducting. The conductivities of the discharge paths of electric valve means 117 are controlled by control grids 129 and 130 which are energized in accordance with the periods of energization of the load circuit by means of a secondary winding 131 of the transformer 91 which is energized in accordance with the voltage of the welding transformer. The secondary winding 131 is provided with a midtap and provides the power supply for a full wave rectifier including an electric discharge device 132 which is connected to produce a unidirectional voltage across a resistor 133 and parallel capacitor 134 during the periods that the welding transformer is energized. The grid 129 controlling the discharge in the left-hand path of the electric valve means 117 is connected with the cathode through a current limiting resistor 135, resistor 133, and the voltage dividing resistor 124 which supplies a component of negative bias. When the welding transformer is de-energized, no voltage appears across resistor 133 and the left-hand discharge path of valve 117 is maintained nonconductive by the negative bias of resistor 124. During this period, the grid 130 of the right-hand discharge path of the electric valve 117 is maintained sufficiently positive with respect to the cathode by the connection of the control member 130 with the terminal 136 of voltage dividing resistors 137 and 138. It will be apparent that the voltage of the control grid 130, during periods of nonconduction of the left-hand electric discharge device 117, may be suitably adjusted by a proper selection of voltage dividing resistors 137 and 138. Conduction by the left-hand discharge path of electric valve means 117 is also effective to render an electric discharge device 139 conductive to render negative the excitation voltage of the control members of the "off-time" filament supply, illustrated generally by the numeral 140. The operation of this circuit will be described in more detail at a later point in the specification.

As previously described, the capacitor 100, which may be considered a memory capacitor, is utilized to establish a voltage at the end of each period of conduction which is a measure of the phase position of the excitation voltages supplied to the control members of the electric valve means connected in the supply circuit of the welding transformer. During the "off" period, the output of the regulating circuit 30 is compared to this voltage and impressed on an "off" time phase shifting circuit, designated generally by the numeral 141 through an amplifier valve 142. The anode-cathode voltage for the amplifier valve 142 is derived from a secondary winding 143 on the transformer 38 by means of a rectifier valve 144, the output of which is impressed across a circuit including a parallel capacitor 145 and resistor 146. The voltage across resistor 146 is impressed across the anode-cathode circuit of the electric valve 142 and the plate resistor 142a connected in series. The cathode of the amplifier valve 142 is connected directly with the positive terminal of the memory capacitor 100, and the control grid 147 is connected with a point of potential which varies with the output of the regulating circuit and which is established by voltage dividing resistors 148 and 149 which are connected in series between the direct current supply conductor 63 and the output conductor 43 of the regulating circuit. As illustrated in the drawings, the control member 147 is connected with an adjustable point on the voltage dividing resistor 149 through a current limiting resistor 150. The control member of valve 142 is connected with the anode thereof through a transient voltage suppression circuit including a series resistor 151 and a capacitor 152. The voltage across plate resistor 153 is, therefore, a unidirectional voltage which varies in accordance with the output of the regulating circuit 30, and this voltage is impressed on the phase shifting circuit 141 to produce periodic voltages of peaked wave form which vary in phase position in accordance with changes in the supply circuit voltage. This circuit 141 is similar to "on-time" phase shifting circuit 29 and comprises a pair of electric discharge devices 153 and 154 having the anode-cathode circuits energized from a midtapped secondary winding 155 of a transformer 156. The anodes are connected to the end terminals and the cathodes are connected together and to the mid-terminal of winding 155 through series connected resistors 157 and 158. The primary winding 159 of the transformer 156 is energized from the alternating current supply circuit 11 by means of the secondary winding 47 of transformer 39. In order to shift the phase of the anode voltages of valves 153 and 154, the transformer primary winding 159 is connected between the mid-terminal of transformer secondary winding 47 and the common terminal of a capacitor 160 and adjustable resistor 161 which are connected in series across the end terminals of the transformer secondary winding 47. As will become more apparent from a consideration of the description of the operation of the system as a whole, it is desirable to retard the periods of conduction of electric valves 153 and 154 of the "off-time" phase shifting circuit into that region of the supply circuit voltage occurring after the minimum heat setting which in many applications is approximately 20 per cent of full heat. The control members of electric valves 153 and 154 are energized by a lagging component of alternating current voltage supplied by a grid transformer 162 and the variable unidirectional component of voltage appearing across resistor 142a of the amplifier circuit including valve 142. As illustrated in the drawings, the cathodes of valves 153 and 154 are connected through the resistor 142a to the mid-terminal of the secondary winding of transformer 162, the end terminals of which are connected with the control members through suitable current limiting resistors 163. The primary winding of transformer 162 is energized from the transformer secondary winding 47 through a phase shifting circuit including resistor 164 and capacitor 165 in much the same manner as the anode transformer 156 is energized. The relative magnitudes of the resistor and capacitor are chosen to give an alternating current component of voltage which lags the voltage impressed on the anodes of valves 153 and 154 by a substantial angle. As will be apparent from the description of the "on-time" phase shifting circuit 29, the circuit 141 is effective to produce periodic voltages of steep wave front across resistor 157 at instants in the supply circuit voltage wave dependent upon the magnitude of the unidirectional voltage appearing across resistor 143. This steep wave front voltage is utilized to control the conductivities of a pair of electric valves 166 and 167 of the "off-time" filament supply circuit 140. The cathodes of electric valves 166 and 167 are connected together, and the anodes thereof are connected, respectively, with the secondary windings 168 and 169 of a transformer 170 having the primary winding 171 thereof energized from the secondary winding 47 of transformer 39 through a phase shifting circuit including a capacitor 172 and an adjustable resistor 173 to impress on the anode-cathode circuits of electric valves 166 and 167 alternating voltages having substantially the same phase position as the anode-cathode voltages impressed on electric valves 153 and 154 of the "off-time" phase shifting circuit. The common cathodes of electric valves 166 and 167 are connected with the midtap of transformer winding 67 and the anodes of these valves are respectively connected with the end terminals of the winding 67 through transformer windings 168 and 169 and conductors 86 and 87. The circuits for the control members of electric valves 166 and 167 are completed from the cathodes through the conductor 86, conductor 63, the voltage dividing resistor 122 which provides a component of negative bias, a conductor 174, the opposite halves of a mid-tapped secondary winding 175 of a transformer 176 and a current limiting resistor 177. The primary winding 178 of transformer 176 is energized with voltages of peaked wave form appearing across the resistor 157 in the output of the "off-time" phase shifting circuit 141. As previously mentioned, the discharge device 139 which is provided with a pair of discharge paths has the anodes thereof connected with the end terminals of the winding 175, and the cathode thereof connected with the anode 118 of switching electric valve 117 so that during the "on" period when the left-hand half of electric valve 117 is conducting, the discharge device 139 is made conducting to render the control members of electric valves 166 and 167 negative.

When the regulating circuit is adjusted to supply full heat to the welding transformer, the regulator may attempt to advance the phase ahead of the power factor angle of the load circuit. This may cause only one of the main electric valves to conduct for a number of cycles and in this way produce unidirectional magnetization of the welding transformer. In order to prevent this action, a circuit for limiting the angle of advance of the peaked voltages produced by the "on-time" phase shifting circuit is provided. As illustrated, this circuit comprises an electric discharge device 179 having a cathode connected with the cathodes of electric valves 31 and 32, and a pair of anodes connected respectively with the control members of electric valves 31 and 32 through individual circuits each of which includes a winding 180 of the transformer 91 energized in accordance with the voltage of the welding transformer, and a winding 181 of the transformer 39 energized in accordance with the supply circuit voltage of circuit 11. The sum of the voltages of windings 180 and 181 is a measure of the voltage across the valves 12 and 13 and by virtue of the valve 179 this voltage is impressed on the control members of valves 31 and 32 during any time that it is more negative than the alternating current bias and unidirectional voltage impressed on these control members by transformer winding 44 and conductors 42 and 43. This circuit operates to prevent the advancement of the voltages impressed on the control members of the power electric valves 12 and 13 beyond the power factor angle in a manner more fully described and claimed in Cooper application, Serial No. 508,611, filed concurrently herewith and assigned to the assignee of the present application.

The features and advantages which characterize our invention will be better understood by a brief consideration of the operation of the embodiment of our invention illustrated in Figs. 1a and 1b. In the preceding description, no reference has been made to any of the heater circuits for the cathodes of the electric valves, and none has been illustrated on the drawings. It will be understood, however, that suitable means for supplying current to the cathode heater elements are provided, and that means for insuring that the cathodes are at operating temperature prior to the completion of the anode-cathode circuits of the electric valves are also provided. With the alternating current circuit 11 energized, a weld period may be initiated under the control of timer 25 by closing the switch 26. As soon as the turn-on voltage from the output of the timer circuit is impressed on transformer 24, the electric valves 12 and 13 will be rendered conductive at instants in the anode-cathode voltage waves established by the phase position of the periodic voltage of peaked wave form produced by the transformer 20. The phase position of this voltage is regulated in accordance with the current supplied to the load circuit and the heat setting established by resistors 86 and 86a by means of the regulating circuit 30. It will be assumed that the current during the first cycle is higher than the value for which the regulator is adjusted and the anode-cathode voltage impressed on the "on-time" filament supply valves 78 and 79 is therefore of greater magnitude and more current is supplied to the filament of the regulating valve 64. Under this condition, more current is conducted by valve 64 and the terminal 69 becomes more negative. This decreases the conductivity of the amplifying electric valve 70 to render the conductor 43 which is connected to the anode of valve 70 more positive. Since the conductor 43 is connected with the cathodes of electric valves 31 and 32 of the "on-time" phase shifting circuit 29, these valves will become conductive at a later point in the anode-cathode voltage wave thereof and will retard the phase of the peaked voltages produced by transformer 20, and in this way reduce the magnitude of the welding current supplied to the transformer 10. If the current supplied during the first cycle is lower than that for which the regulator is adjusted, the converse of the above action takes place and the phase of the voltages produced by the transformer 20 is advanced. During the time that the load circuit is energized, a positive bias is impressed on the left-hand control grid 129 of electric discharge device 117 by resistor 133. This renders the left-hand half of discharge device 117 conducting and the right-hand half of this valve is maintained nonconducting by the voltage of terminal 136 of voltage dividing resistors 137 and 138. Conduction by the left-hand half of valve 117 depresses the voltage of control member 116 of valve 109 substantially to the cathode voltage of valve 117 and maintains the right-hand half of discharge device 116 nonconducting. This renders the charging electric valve 101 for memory capacitor 100 conductive under the control of the output voltage of the amplifying valve 70 to charge the memory capacitor 100 in accordance with the output of the regulating circuit 30. During this "on" time, the right-hand half of valve 117 is nonconducting and the left-hand half of valve 109 is, therefore, maintained conducting to establish a discharge path for capacitor 100 to allow the voltage thereof to decrease during those periods that the regulator is operative to retard the phase of the voltages impressed on control members of electric valves 12 and 13. Thus, the capacitor 100 is charged and discharged during the periods of energization of the welding transformer to maintain thereon a voltage which is a measure of the phase position of the excitation voltages being impressed on the control members of valves 12 and 13. As soon as the period of energization established by the timer 25 is complete, the "turn-on" sinusoidal voltage of transformer 24 disappears and the combination of voltages impressed on the control members of valves 12 and 13 by the peaking transformer 20 and the hold-off transformer 22 is insufficient to maintain these valves conductive. As soon as the welding transformer is de-energized the positive bias voltage appearing across resistor 133 disappears and the state of conductivity of the paths of discharge device 117 reverses; that is, the left-hand half becomes nonconductive and the right-hand half becomes conducting. This also reverses the state of conductivity of valve 109; the left-hand half becomes nonconductive and the right-hand half becomes nonconductive. When the left-hand half of valve 109 becomes nonconductive, the discharge path for memory valve 100 is interrupted and when the right-hand half of valve 109 becomes conducting the control member 102 of the charging electric valve 100 is brought to the negative voltage of conductor 63 and the charging circuit of electric valve 100 is effectively interrupted. Therefore, the voltage of capacitor 100 is maintained at the value existing at the last instant of the period of energization. The voltage of the capacitor 100 is compared with the voltage of an adjustable potential on voltage dividing resistor 149 which varies in accordance with the output of the regulator circuit 30 and is impressed on the control member of the amplifying electric valve 142 to produce a variable unidirectional voltage across resistor 142a which varies in magnitude in accordance with variations in the output of the regulating circuit 30 with respect to the voltage of capacitor 100. Variations in the magnitude of the unidirectional voltage appearing across resistor 142a control the "off time" phase shifting circuit 141 to shift the phase of the peaked voltages impressed on the control members of electric valves 166 and 167 of the "off-time" filament supply 140 to change the magnitude of the heating current supplied to the filament of the regulating electric valve 64. In this way, the energization of the regulating valve 64 is varied during the "off" period in a manner to compensate for changes in the magnitude of the supply circuit voltage. For example, if the supply circuit voltage increases during the "off" period, the current supplied to the filament of regulating valve 64 by the "off-time" filament supply circuit 140 for a given phase position of the peaked voltages produced by transformer 175 will increase. This will render the terminal 69 connected with the anode of the regulating valve 64 more negative and will, therefore, render the conductor 43 more positive. This renders the control member of the amplifying valve 142 more positive with respect to the cathode thereof which is maintained at a fixed potential by the memory capacitor 100 and increases the conductivity of the valve 142. This results in an increase in the magnitude of the negative unidirectional voltage impressed on the control members of electric valves 153 and 154 which, in turn, retards the instant at which those valves are rendered conductive to retard the phase position of the peaked voltages impressed on the control members of valves 166 and 167 of the "off-time" filament supply. Thus when the initiating switch 26 is closed to establish a second spot, the regulating circuit and particularly the filament of the regulating valve 64 is conditioned to supply exactly the desired amount of current to the welding transformer, assuming the constants of the load circuit have not changed between successive welds. From one point of view, the circuit of the present invention may be considered as an "on-time" voltage regulator and an "off-time" voltage compensator in which the voltage compensation during the "off" time is accomplished with respect to the supply circuit voltage at the last instant of the preceding period of energization of the load circuit. By utilizing electronic switching in transferring from the "off-time" to the "on-time" circuit, substantially no delay is encountered and the "on-time" regulating circuit becomes effective immediately. Inasmuch as the anode-cathode voltages of the "off-time" phase shifting circuit 141 and "off-time" filament supply circuit 140 are retarded with respect to the anode-cathode voltages of the main electric valves 12 and 13 to such an extent that the valves of these circuits are only rendered conductive during the interval of time following the instants at which the main electric valves 12 and 13 would be rendered conductive for minimum current to the welding transformer, the "off-time" circuits may be considered as waiting to see whether or not there is to be a period of energization before becoming operative. As soon as the load is energized, the off-time circuits are prevented from effecting energization of the regulating valve 64 by means of the restraining valve 139 which is controlled by the switching valve 117 in response to energization of the welding transformer.

In some applications, refinements in the regulator which include charging the memory capacitor during the periods of energization of the load circuit to establish a reference voltage for regulating action during periods of deenergization may not be considered essential, and appreciable simplification of the control circuit may be made by utilizing a preestablished reference voltage of fixed magnitude as a reference for regulation during the periods of deenergization. In the modification of our invention shown in Figs. 2a and 2b considered together, we have shown a regulating circuit which is in general the same as the modification of Figs. 1a and 1b, but in which the memory capacitor 100 has been omitted and the regulating circuit 30 is somewhat simplified. In this modification also the "off-time" phase shifting circuit as a separate means for producing the peaked voltage has been omitted and the variable unidirectional voltage produced by the regulating circuit during periods of deenergization of the load circuit is impressed on the control members of the "off-time" filament supply tubes together with a lagging component of alternating current voltage to produce directly an "off-time" filament supply of variable magnitude. In Figs. 2a and 2b the components of the circuit corresponding to the components of the circuit in Figs. 1a and 1b have been designated by the same numerals, and in some cases where the components do not correspond exactly the numerals have been primed.

Referring now to Figs. 2a and 2b and particularly to the regulating circuit 30', the direct current supply voltage is provided across conductors 50 and 51 by the rectifier including discharge device 52. Different levels of voltage are provided by voltage dividing resistors 182, 183, 184 and potentiometer 185 which are connected in series across the direct current conductors 50 and 51. A potentiometer for establishing a reference voltage for the "off-time" filament supply is provided by a potentiometer 186 which is connected in series with a resistor 187, and across the conductor 50 and the movable tap 188 of potentiometer 185. Connected in parallel with potentiometer 186 and resistor 187 is a resistor 189 and potentiometer 190, the movable tap 191 of which establishes a negative bias voltage for the electric valves 78 and 79 of the "on-time" filament supply circuit. The regulating electric valve 64 has the anode-cathode circuit thereof connected in series with a resistor 192 and across the terminals of resistor 184 and potentiometer 185. Variations in the conductivity of the regulating electric valve 64 are impressed on the control member of an amplifying valve 193 which is resistance coupled to a second amplifying valve 194 having the anode thereof connected with the conductor 43 which is one line of the bias supply for the "on-time" phase shifting circuit. The control member of valve 193 is connected with the anode of regulating valve 64 through a resistor 195, and the anode-cathode circuit is connected in series with a resistor 196 and across conductors 50 and 197, the latter conductor being connected to the common terminal of resistor 184 and potentiometer 185. The second stage of amplification including valve 194 is resistance coupled to the anode of valve 193 by resistor 198. The anode-cathode circuit of valve 194 is connected in series with a resistor 199 and across conductors 50 and 197. The control members of valves 193 and 194 are connected with the respective anodes thereof through transient voltage suppression circuits each including a capacitor 200 and resistor 201. An electric valve 202, having the anode-cathode circuit thereof connected in series with a resistor 203 and across the conductors 50 and 197, is provided for rendering the "off-time" filament supply circuit 140 ineffective in response to energization of the load circuit. This valve corresponds essentially to the triode comprising the left-hand discharge path of the electric valve 117 of Fig. 1a and functions in response to energization of the welding transformer to render the cathode of the electric valve 139 negative with respect to the anodes thereof and in this manner to maintain the control members of electric valves 166 and 167 of the "off-time" filament supply circuit negative for the duration of each period of energization of the load circuit.

In regulating circuits particularly for resistance welding applications, it is often desirable to know when the regulator is adjusted to supply full heat to the welding load, that is, when the regulator is adjusted to render the electric valves conductive at the power factor angle of the load circuit. This may be accomplished by utilizing an indicator circuit responsive to the voltage appearing across the electric valves which interconnect the supply circuit and the welding circuit.

Referring now to the drawings, this circuit comprises an indicating device, such as a glow discharge tube 204, connected in series with a unilaterally conducting device, such as an electric valve 205, and across the anode-cathode circuit of controlled electric valve 206. The anode-cathode voltage for the electric valve 206 is supplied by the secondary winding 207 of a transformer 208 having a primary winding 209 energized from the secondary winding 47'. The voltage impressed on valve 206 by winding 207 is retarded in phase with respect to the supply circuit voltage by means of resistor 210 connected in series with the anode-cathode circuit of electric valve 206 and resistor 211 and capacitor 212 which are connected in series and across the anode-cathode circuit of valve 206. The control member of electric valve 206 is energized with a component of voltage from the supply circuit by a secondary winding 213 of the transformer 208, and a second component of voltage by the lower half of the winding 131 which is energized in accordance with the voltage across the welding transformer. These two voltages added together are a measure of the voltage appearing across the main electric valves 12 and 13 and are employed instead of utilizing directly the voltage across these valves since it has been found undesirable in practice to connect directly across the anode-cathode circuits of the gas-filled electric valves supplying the load circuit, particularly when anode firing is used for immersion-ignitor type electric valves. This voltage appearing across these transformer windings is impressed on a circuit including a resistor 214 and a capacitor 215 in series to charge the capacitor 215 in accordance with the voltage appearing across electric valves 12 and 13. The magnitudes of resistor 214 and capacitor 215 are chosen to delay the charging of the capacitor sufficiently to prevent electric valve 206 from being rendered conductive when the voltage appearing across the anode-cathode circuit of electric valves 12 and 13 is a minimum. This circuit for indicating the full-heat operation of the welder is described and claimed in my application Serial No. 506,612 filed concurrently herewith and assigned to the assignee of the present application.

The operation of the system described above is in general similar to the operation of the embodiment illustrated in Figs. 1a and 1b. However, a brief consideration of the operation of this embodiment will serve to establish the differences between the two modifications. When the initiating switch 26 is closed, the electric valves 12 and 13 are rendered conductive for a period dependent upon the operation of timer 25 and at instants in the anode-cathode circuit voltage dependent upon the phase position of the periodic voltage produced by the main phase shifting circuit 29. The operation of the regulating circuit 30' during the "on" time is essentially the same as the circuit 30 of Figs. 1a and 1b. For example, if the load current tends to increase above the value for which the regulator is set, the energization of the filament for regulating valve 64 is increased and the control member of amplifying valve 193 is rendered more negative. This renders the control member of the amplifier valve 194 more positive which renders the conductor 43 more negative to retard the phase of peaked voltage produced by the "on-time" phase shifting circuit 29. As soon as the electric valves 12 and 13 are rendered nonconductive by operation of the timer 25, the voltage appearing across resistor 133 disappears and switching electric valve 202 is rendered nonconducting. This raises the cathode voltage of discharge valve 139 to remove the negative bias from the electric valves 166 and 167 of the "off-time" filament supply. The electric valves 78 and 79 are maintained nonconductive during the off time by means of the negative bias impressed on the control members thereof by the adjustable tap 191 of potentiometer 190. During the periods of deenergization of the load circuit, the filament of the regulating electric valve 64 is energized by the output of the "off-time" filament supply 140 including electric valves 166 and 167. The control members of these valves are controlled directly in accordance with the unidirectional voltage appearing between the output conductor 43 of the regulating circuit and the adjustable tap of the potentiometer 186. Since the anode-cathode circuits of electric valves 166 and 167 are energized in accordance with the voltage of supply circuit 11, any fluctuations in the supply circuit voltage will vary the energization of regulating valve 64 and modify the output of the regulating circuit in accordance with the supply line fluctuations, which in turn changes the energization of the regulating valve 64. In this way, the regulating circuit including the heated filament is kept in condition during the "off" time so that upon energization of the load circuit the regulator is preconditioned at approximately the proper regulating point. The setting of the adjustable tap of potentiometer 186 may be made in any desirable manner, and we prefer to provide an ammeter 217 in the output of the "on-time" phase shifting circuit 29. The reading of this ammeter during periods of energization may be noted and the adjustable tap on the potentiometer 186 adjusted so that the reading is just slightly less than the "on-time" reading and thus corresponds to a slightly retarded firing of valves 31 and 32. This will provide regulation during the "off" time to a heat setting slightly below the heat setting of the welder circuit. Since adjustment of the movable tap of potentiometer 186 changes the cathode voltage of the electric valves 78 and 79 of the "on-time" filament supply, the movable tap 191 of potentiometer 190, which determines the magnitude of the negative bias impressed on the control members of these valves, is simultaneously adjusted and assures these valves are maintained nonconducting during periods of deenergization of the load circuit.

While we have shown and described particular embodiments of our invention, it will be obvious to those skilled in the art that changes and modifications may be made without departing from our invention in its broader aspects, and we, therefore, aim in the appended claims to cover all such changes and modifications as fall within the true spirit and scope of our invention.

What we claim as new and desire to secure by Letters Patent of the United States is:

1. In combination, an alternating current supply circuit, a load circuit, electric translating apparatus interconnecting said circuits including electric valve means having a control electrode, timing means for controlling said electric valve means for establishing periods of energization of said load circuit, excitation means for energizing said control electrode to establish the instant in the supply circuit voltage that said valve means is rendered conducting during said periods of energization comprising a regulating circuit, means responsive to the current supplied to said load circuit for energizing said regulating circuit, means for establishing an electrical quantity having a magnitude dependent upon the instant of initiation of conduction of said electric valve means during the latter portion of each period of conduction, and means for energizing said regulating circuit during periods of deenergization of said load circuit in accordance with variations in the voltage of said supply circuit by comparing the output of said regulating circuit with said electrical quantity.

2. In combination, an alternating current supply circuit, a load circuit, electric translating apparatus interconnecting said circuits including electric valve means having a control electrode, an excitation circuit for said control electrode for determining the periods of energization of said load circuit and for determining the instant of initiation of conduction of said electric valve means during each cycle of energization of said load circuit comprising a regulator circuit including an electric valve having a cathode of the filamentary type, means responsive to the current supplied to said load circuit during periods of energization thereof for energizing said filament, means for establishing at the end of each period of energization an electrical quantity having a magnitude dependent upon the instant of conduction of said valve means, means for energizing said filamentary cathode during periods of deenergization of said load circuit in accordance with the voltage of said supply circuit, and means for varying the energization of said cathode during periods of deenergization of said load circuit as the output of said regulating circuit varies with respect to said electrical quantity.

3. In combination, an alternating current supply circuit, a load circuit, electric translating apparatus interconnecting said circuits including electric valve means having a control electrode, timing means for controlling said electric valve means for establishing periods of energization of said load circuit, excitation means for energizing said control electrode to establish the instant in the supply circuit voltage that said valve means is rendered conducting during said periods of energization to maintain the current supplied to said load circuit constant comprising a regulating circuit, means responsive to the current supplied to said load circuit for energizing said regulating circuit, means for establishing at the end of each period of energization an electrical quantity having a magnitude dependent upon the instant of initiation of conduction of said electric valve means at the end of each period of conduction, means for energizing said regulator during periods of deenergization of said load circuit in accordance with variations in the voltage of said supply circuit by comparing the output of said regulating circuit with said electrical quantity, and electronic switching means for transferring the energization of said regulating circuit from said last mentioned means to said means responsive to current.

4. In combination, an alternating current supply circuit, a load circuit, electric translating apparatus interconnecting said circuits including electric valve means having a control electrode, an excitation circuit for said control electrode for determining the periods of energization of said load circuit and for determining the instant of initiation of conduction of said electric valve means during each cycle of energization of said load circuit comprising a regulator circuit including an electric valve having a cathode of the filamentary type, means responsive to the current supplied to said load circuit during periods of energization thereof for energizing said filament, means for establishing at the end of each period of energization an electrical quantity having a magnitude dependent upon the instant of conduction of said valve means, means for energizing said filamentary cathode during periods of deenergization of said load circuit in accordance with the voltage of said supply circuit, means for varying the energization of said cathode during periods of deenergization of said load circuit as the output of said regulating circuit varies with respect to said electrical quantity, and means for transferring the energization of said filamentary cathode from said last mentioned means to said current responsive means in response to energization of said load.

5. In combination, an alternating current supply circuit, a load circuit, electric translating apparatus interconnecting said circuits and including electric valve means having a control electrode, excitation means for controlling the energization of said control electrode to determine the cycles during which said valve means conducts and the instant in the cycles that conduction is initiated comprising a regulator circuit, means for variably energizing said regulator circuit in accordance with the current supplied to said load circuit during periods of energization of said load circuit, means for variably energizing said regulator circuit during periods of deenergization of said load circuit in accordance with fluctuations in the voltage of said supply circuit, and electronic switching means responsive to energization of said load circuit for rendering said last mentioned means ineffective during periods of energization of said load circuit.

6. In combination, an alternating current supply circuit, a load circuit, electric translating apparatus interconnecting said circuits and including electric valve means having a control electrode, excitation means for controlling the energization of said control electrode to determine the cycles during which said valve means conduct and the instant in the cycles that conduction is initiated comprising a regulator circuit, means for variably energizing said regulator circuit in accordance with the current supplied to said load circuit during periods of energization of said load circuit to maintain the current supplied to said load circuit constant, means for variably energizing said regulator circuit during periods of deenergization of said load circuit in accordance with fluctuations in the voltage of said supply circuit, and electronic switching means for transferring energization of said regulator from one of said last two mentioned means to the other in accordance with the energization of said load circuit.

7. A regulating circuit for regulating the current supplied to a load circuit which is intermittently energized from an alternating current supply circuit comprising an input circuit and an output circuit, means for variably energizing said input circuit during periods of energization of said load circuit in accordance with the current supplied to said load circuit, means energized from said output circuit for controlling the magnitude of the current supplied to said load circuit, means energized from said supply circuit for energizing the input of said regulator during periods of deenergization of said load circuit, and means energized from the output of said regulator for controlling said last mentioned means to variably energize said input circuit in accordance with voltage fluctuations of said supply circuit during the periods of deenergization of the load circuit.

8. In combination, an alternating current supply circuit, a load circuit, electric translating apparatus interconnecting said circuits including electric valve means having a control electrode, timing means for controlling said electric valve means to establish periods of energization of said load circuit, excitation means for energizing said control electrode to establish the instants in the supply circuit voltage that said electric valve means is rendered conducting to maintain the current supplied to said load circuit substantially constant comprising a regulating circuit having input and output terminals, means for energizing said input terminals in accordance with the current supplied to said load circuit during periods of energization thereof, means energized from said alternating current supply circuit for energizing said input terminals during periods of deenergization of said load circuit, and means responsive to the voltage of the output terminals of said regulating circuit for controlling said last mentioned means to adjust the output of the regulator in a manner to compensate for supply circuit voltage fluctuations.

9. In combination, an alternating current supply circuit, a load circuit, electric translating apparatus interconnecting said circuits including electric valve means having a control electrode, timing means for controlling said electric valve means for establishing periods of energization of said load circuit, excitation means for energizing said control electrode to establish the instants in the supply circuit voltage that said electric valve means is rendered conducting during said periods of energization comprising a regulating circuit for producing a unidirectional voltage, means responsive to the current supplied to said load circuit for variably energizing said regulating circuit to vary the magnitude of said unidirectional voltage, a phase shifting circuit for energizing said control electrode and energized in accordance with said unidirectional voltage, a second phase shifting circuit, means for energizing said second phase shifting circuit in accordance with the output of said regulating circuit, and means responsive to said second phase shifting circuit for controlling the energization of said regulating circuit during periods of deenergization of said load circuit.

10. In combination, an alternating current supply circuit, a load circuit, electric translating apparatus interconnecting said circuits including electric valve means having a control electrode, timing means for controlling said electric valve means for establishing periods of energization of said load circuit, excitation means for energizing said control electrodes to establish the instants in the supply circuit voltage that said electric valve means is rendered conducting during said periods of energization comprising a regulating circuit for producing a unidirectional voltage, means responsive to the current supplied to said load circuit for energizing said regulating circuit, means responsive to said unidirectional voltage for varying the coductivity of said electric valve means to maintain the magnitude of the current supplied to said load circuit constant, a supply circuit for energizing said regulating circuit during periods of deenergization of said load circuit including an electric valve, means for energizing said electric valve from said alternating current supply circuit and for retarding the phase of the voltage impressed on said electric valve with respect to the voltage impressed on said electric valve means, and means for varying the conductivity of said electric valve in accordance with the output of said regulating circuit during periods of deenergization of said load circuit to control the energization of said regulating circuit.

11. In combination, an alternating current supply circuit, a load circuit, electric translating apparatus interconnecting said circuits including electric valve means having a control electrode, timing means for controlling said electric valve means for establishing periods of energization of said load circuit, excitation means for energizing said control electrodes to establish the instants in the supply circuit voltage that said electric valve means is rendered conducting during said periods of energization comprising a regulating circuit for producing a unidirectional voltage, means for energizing said regulating circuit in accordance with the current supplied to said load circuit, a capacitor, means for controlling the charge on said capacitor during periods of energization of said load circuit so that the voltage of said capacitor is a measure of the conductivity of said electric valve means, a circuit for energizing said regulating circuit during periods of deenergization of said load circuit including an electric valve having the anode-cathode circuit thereof energized from said alternating current supply circuit, and means for controlling the conductivity of said electric valve means in accordance with variations in the output voltage of said regulating circuit with respect to the voltage of said capacitor during periods of deenergization of said load circuit.

12. In combination, an alternating current supply circuit, a load circuit, electric translating apparatus interconnecting said circuits including electric valve means having a control electrode, timing means for controlling said electric valve means for establishing periods of energization of said load circuit, excitation means for energizing said control electrodes to establish the instants in the supply circuit voltage that said electric valve means is rendered conducting during said periods of energization comprising a regulating circuit for producing a unidirectional voltage, means for energizing said regulating circuit in accordance with the current supplied to said load circuit, a capacitor, charging and discharging circuits for said capacitor for maintaining the voltage on said capacitor which is at each instant during periods of energization a measure of the phase position of electric valve means, initiation of conduction of said means for interrupting said charging and discharging circuits at the end of each period of energization, and means responsive to variations in the output voltage of said regulator circuit with respect to said capacitor voltage for variably energizing said regulator circuit during periods of deenergization of said load circuit.

13. In combination, a load circuit, means for supplying timed applications of current to said load circuit including timing means, a source of voltage, a capacitor, a charging circuit including an electric valve for controlling the charging of said capacitor from said source of voltage, a discharging circuit shunting said capacitor and including an electric valve, electric discharge means including a pair of discharge paths connected to control the conductivity of the electric valves in said charging and discharging circuits, means for normally rendering one of said discharge paths conducting and the other of said discharge paths non-conducting to maintain both charging and discharging circuits ineffective, and means responsive to said timing means for reversing the state of conductivity of said discharge paths to render the valves of said charging and discharging circuits simultaneously conductive whereby the charge on said capacitor is adjusted during certain intervals and maintained constant during other intervals determined by said timing means.

14. In combination, a load circuit, electric translating apparatus for supplying timed applications of current to said load circuit, a capacitor, means for charging said capacitor to a voltage dependent upon the value of an operating condition of said translating apparatus during cycles of energization of said load circuit, a discharge path connected in parallel with said capacitor and including an electric valve having a control member, means for energizing said control member to render said discharge path conductive only during periods of energization of said load circuit so that the charge on said capacitor is adjusted in either direction as the magnitude of said operating condition varies and for maintaining the charge on said capacitor during periods of deenergization at a value corresponding to the value of said condition at the end of the preceding period of energization.

15. In combination, a load circuit, electric translating apparatus for supplying timed applications of current to said load circuit, a capacitor, means for charging said capacitor to a voltage dependent upon the value of an operating condition of said translating apparatus during cycles of energization of said load circuit, a discharge path connected in parallel with said capacitor and including circuit controlling means, means for energizing said circuit controlling means to render said discharge path conductive only during periods of energization of said load circuit so that the charge on said capacitor is adjusted in either direction as the magnitude of said operating condition varies and for maintaining the charge on said capacitor during periods of deenergization at a value corresponding to the value of said condition at the end of the preceding period of energization.

16. In combination, a supply circuit, electric translating apparatus including a load circuit connected for energization from said supply circuit, said translating apparatus including timing means for effecting timed applications of current to said load circuit, a capacitor, means including a unilaterally conducting device for charging said capacitor to a voltage dependent upon the value of an operating condition of said translating apparatus during cycles of energization of said load circuit, a discharge path connected in parallel with said capacitor and including an electric valve having a control member, means for energizing said control member to render said discharge path conductive only during periods of energization of said load circuit so that the charge on said capacitor is adjusted in either direction as the magnitude of said operating condition varies, and means responsive to said timing means for rendering said valve nonconductive to maintain the charge on said capacitor during periods of deenergization at a value corresponding to the value of said condition at the end of the preceding period of energization.

BENJAMIN COOPER.
ORRIN W. LIVINGSTON.